United States Patent
Zemke et al.

(10) Patent No.: US 8,827,042 B2
(45) Date of Patent: Sep. 9, 2014

(54) ELEVATOR REGENERATIVE DRIVE INCLUDING AN AIR CORE INDUCTOR

(75) Inventors: Wolfgang Lutz Zemke, Berlin (DE); Marvin Dehmlow, Berlin (DE); Michael Mann, Berlin (DE)

(73) Assignee: Otis Elevator Company, Farmington, CT (US)

(*) Notice: Subject to any disclaimer, the term of this patent is extended or adjusted under 35 U.S.C. 154(b) by 542 days.

(21) Appl. No.: 13/255,972

(22) PCT Filed: Mar. 31, 2009

(86) PCT No.: PCT/US2009/038927
§ 371 (c)(1),
(2), (4) Date: Sep. 12, 2011

(87) PCT Pub. No.: WO2010/114520
PCT Pub. Date: Oct. 7, 2010

(65) Prior Publication Data
US 2012/0000730 A1  Jan. 5, 2012

(51) Int. Cl.
*B66B 1/06* (2006.01)
*H02P 3/18* (2006.01)
*B60L 7/10* (2006.01)
*B66B 1/30* (2006.01)
*B66B 1/32* (2006.01)

(52) U.S. Cl.
CPC .............. *B66B 1/302* (2013.01); *Y02B 50/127* (2013.01); *H02P 3/18* (2013.01); *B60L 7/10* (2013.01); *Y02T 10/642* (2013.01); *B66B 1/32* (2013.01)
USPC .......................................... 187/289; 318/376

(58) Field of Classification Search
USPC ......... 187/247, 277, 289, 290, 293, 296, 297, 187/391–393; 318/362, 366, 372, 375, 376, 318/377, 378, 745, 759; 307/401; 323/261
See application file for complete search history.

(56) References Cited

U.S. PATENT DOCUMENTS

| | | | |
|---|---|---|---|
| 3,882,370 A | | 5/1975 | McMurray |
| 4,260,938 A | * | 4/1981 | Joyes .............................. 318/434 |
| 4,347,466 A | * | 8/1982 | Ottoson ........................ 388/806 |
| 4,484,664 A | * | 11/1984 | Nomura ........................ 187/290 |
| 4,506,766 A | * | 3/1985 | Watanabe ...................... 187/290 |

(Continued)

FOREIGN PATENT DOCUMENTS

| | | |
|---|---|---|
| CN | 2221838 Y | 3/1996 |
| JP | S6253192 A | 3/1987 |

(Continued)

OTHER PUBLICATIONS

International Preliminary Report on Patentability for International application No. PCT/US2009/038927 mailed Oct. 13, 2011.

(Continued)

*Primary Examiner* — Anthony Salata
(74) *Attorney, Agent, or Firm* — Carlson, Gaskey & Olds

(57) ABSTRACT

An exemplary elevator machine includes a motor that operates in a first mode to move an elevator car and in a second mode to generate power. A line reactor is associated with the motor for delivering power generated by the motor operating in the second mode. The line reactor includes an air core inductor.

6 Claims, 2 Drawing Sheets

(56) References Cited

U.S. PATENT DOCUMENTS

| | | | |
|---|---|---|---|
| 4,642,474 A * | 2/1987 | Watanabe | 307/64 |
| 4,666,020 A * | 5/1987 | Watanabe | 187/290 |
| 4,678,063 A * | 7/1987 | Kitaoka et al. | 187/296 |
| 4,779,709 A | 10/1988 | Mitsui et al. | |
| 5,111,091 A | 5/1992 | Bahn | |
| 5,420,491 A | 5/1995 | Kanzaki et al. | |
| 5,432,420 A | 7/1995 | Bahn | |
| 5,514,923 A | 5/1996 | Gossler et al. | |
| 5,712,456 A | 1/1998 | McCarthy et al. | |
| 5,808,880 A | 9/1998 | Marvin | |
| 6,198,238 B1 * | 3/2001 | Edelson | 318/148 |
| 6,439,347 B2 | 8/2002 | Suga et al. | |
| 6,710,653 B2 | 3/2004 | Honda et al. | |
| 6,827,182 B2 * | 12/2004 | Araki | 187/290 |
| 6,853,569 B2 | 2/2005 | Cheng et al. | |
| 6,891,302 B1 | 5/2005 | Gabrys | |
| 7,151,354 B2 | 12/2006 | Yoshinaga et al. | |
| 7,170,247 B2 | 1/2007 | Yoshinaga et al. | |
| 7,221,251 B2 | 5/2007 | Menegoli et al. | |
| 7,227,323 B2 * | 6/2007 | Yamada et al. | 318/376 |
| 7,837,011 B2 * | 11/2010 | Takasaki et al. | 187/296 |
| 8,146,714 B2 * | 4/2012 | Blasko | 187/290 |
| 8,230,978 B2 * | 7/2012 | Agirman et al. | 187/290 |
| 2002/0149417 A1 | 10/2002 | Kumano et al. | |
| 2005/0087400 A1 | 4/2005 | Zhou | |

FOREIGN PATENT DOCUMENTS

| | | |
|---|---|---|
| JP | H04275069 A | 9/1992 |
| JP | 10-067469 | 3/1998 |
| JP | H10167593 A | 6/1998 |
| JP | 2005104681 A | 4/2005 |
| JP | 2005145598 A | 6/2005 |
| WO | 2008085171 A1 | 7/2008 |

OTHER PUBLICATIONS

International Search Report and Written Opinion of the International Searching Authority for International application No. PCT/US2009/038927 mailed Dec. 28, 2009.

State Intellectual Property Office of People's Republic China, Supplementary Search Report, Application No. 200980158573.4 dated Jan. 20, 2014.

State Intellectual Property Office of People's Republic China, Search Report, Application No. 200980158573.4 dated Jun. 3, 2013.

* cited by examiner

ELEVATOR REGENERATIVE DRIVE INCLUDING AN AIR CORE INDUCTOR

BACKGROUND

Elevator systems are well known and in widespread use. An elevator car is supported for movement within a hoistway for carrying passengers between various levels within a building, for example. Many elevator systems include a counterweight associated with the elevator car by a roping arrangement. A machine (e.g., motor and brake) controls movement of the roping arrangement to control the movement and position of the elevator car within the hoistway.

Operating the machine requires power. It is desirable to minimize the amount of power consumed by an elevator system. One feature that has been proposed for effectively reducing the total amount of power used by the elevator system is to use the motor of the machine in a generator mode under certain conditions. For example, there are times when movement of the elevator car can be accomplished without requiring a driving force from the motor. Releasing the brake and allowing the motor to rotate responsive to movement of the associated traction sheave allows for the motor to generate electrical power. There are proposed arrangements for such use of an elevator machine.

One challenge that is presented when attempting to use an elevator machine for purposes of generating power is the introduction of additional noise. Components associated with an elevator drive that are used for purposes of generating power tend to be noisy. This issue becomes even more prominent when a machine roomless arrangement is used because the motor and drive components are contained within the hoistway. Any additional noise within the hoistway is potentially additional noise introduced into the elevator car. Maintaining a quiet and smooth elevator ride is a primary concern to elevator system designers and operators.

SUMMARY

An exemplary elevator machine includes a motor that operates in a first mode to move an elevator car and in a second mode to generate power. A line reactor is associated with the motor for delivering power to the motor operating in the first mode and from the motor operating in the second mode. The line reactor comprises an air core inductor.

The various features and advantages of the disclosed example will become apparent to those skilled in the art from the following detailed description. The drawings that accompany the detailed description can be briefly described as follows.

DETAILED DESCRIPTION

Figure 1:
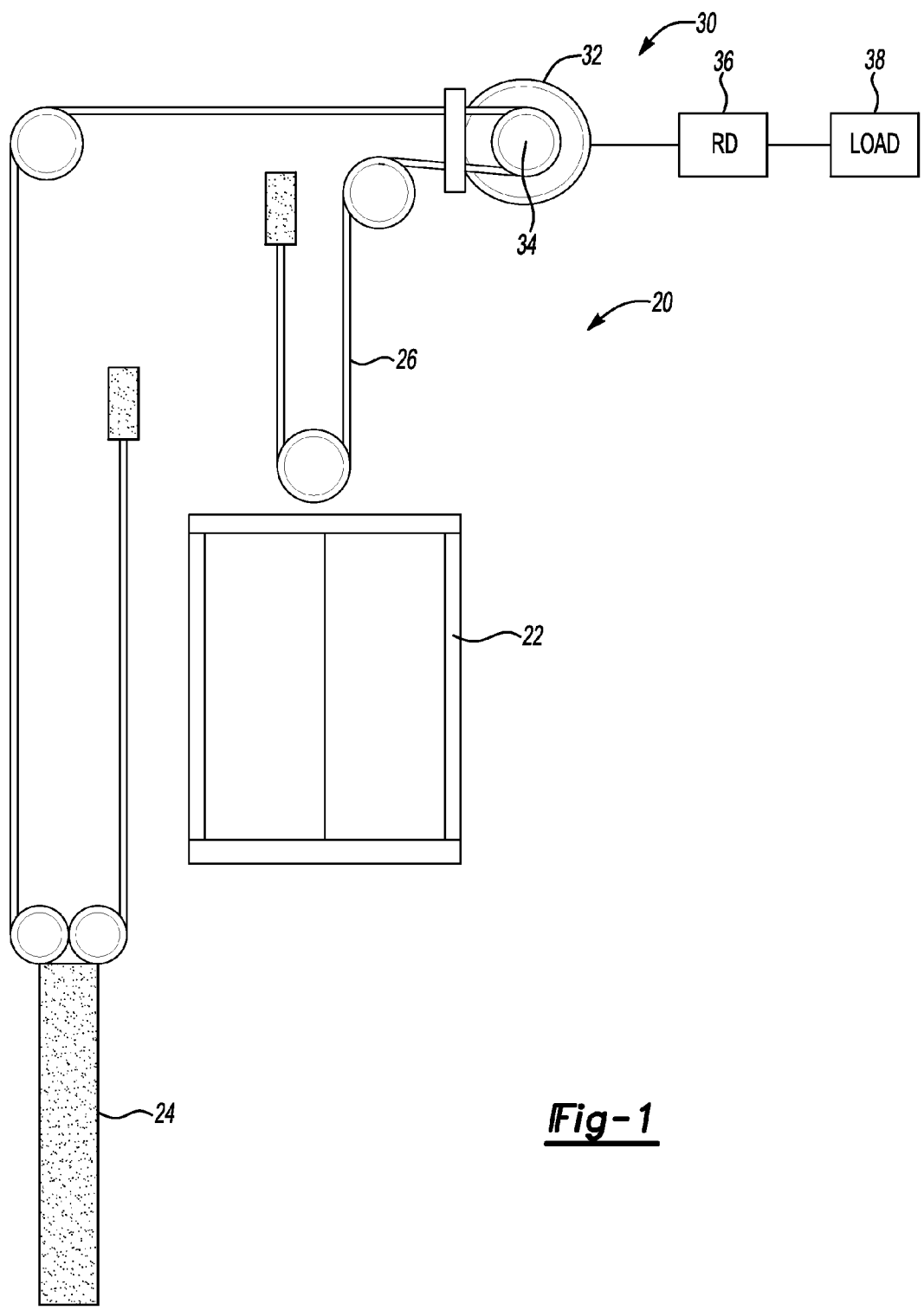
FIG. 1 schematically illustrates selected portions of an elevator system.

FIG. 1 schematically shows selected portions of an elevator system 20 including an elevator car 22 and counterweight 24. A roping arrangement (e.g., round ropes or flat belts) supports the weight of the elevator car 22 and counterweight 24 in a known manner.

An elevator machine 30 includes a motor 32 associated with a traction sheave 34. The motor 32 selectively causes movement of the traction sheave 34 to cause corresponding movement of the roping arrangement 26 to control the position and movement of the elevator car 22 within a hoistway. When a motive force is required from the motor 32 for moving the traction sheave 34, the machine 30 operates in a first mode in which it consumes power. Under some operating conditions, the elevator car 22 can move without requiring a motive force from the motor 32.

Under some conditions, for example, the weight of the counterweight 24 can be relied upon to cause the elevator car 22 to rise within the hoistway as the counterweight 24 is allowed to descend. Releasing the brake of the elevator machine 30 and allowing the components of the motor 32 to rotate with the rotation of the traction sheave 34 under such conditions allows for the motor 32 to generate electrical power. The example motor 32 operates in a second mode for generating power.

The example machine 30 includes a regenerative drive portion 36 for providing power to the motor 32 operating in the first mode and providing power generated by the motor 32 to a load 38 when the motor 32 operates in the second mode. In one example, the load 38 comprises a power grid interface or an energy storage device that allows for the power generated by the motor 32 to subsequently be fed back to the motor 32 when the machine 30 requires power for moving the elevator car 22. In another example, the load 38 comprises a device that requires electrical power for purposes of its own operation.

Figure 2:
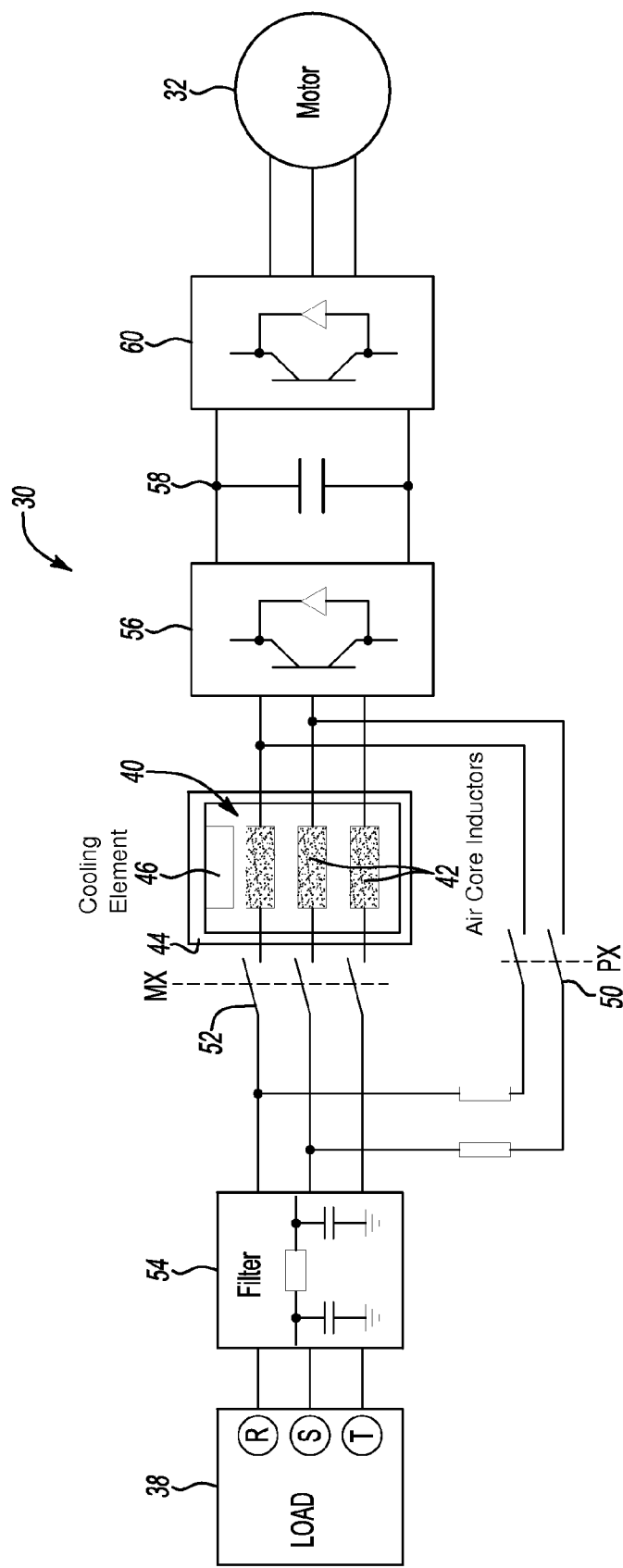
FIG. 2 schematically illustrates an example elevator machine arrangement.

FIG. 2 schematically illustrates an example elevator machine 30 in which the regenerative drive portion 36 includes a line reactor 40 to be able to feed power generated by the motor 32 to the load 38. The line reactor 40 in this example comprises an air core inductor 42. In this example, three phase power is provided to the load 38 and three air core inductors 42 are included.

Air core inductors 42 are included in the example arrangement for reducing noise associated with the machine 30 operating in a power generating mode. An air core inductor arrangement including a coil wrapped around a non-magnetic material (e.g., plastic) allows for operating the machine 30 in a regenerative drive mode without introducing additional noise.

Some example air core inductors may not involve coil windings but do include conductors arranged in an air core configuration. Given this description, those skilled in the art will be able to select an appropriate air core configuration to meet their particular needs. Additionally, those skilled in the art who have the benefit of this description will be able to select an appropriate inductance value depending on the motor and other components associated with the machine 30 and the desired level of performance for their particular situation.

Iron core inductors, for example, experience magneto restriction in the iron core and that introduces noise into the elevator environment. An air core inductor does not have any such noise issues. Therefore, the example arrangement is well-suited for use in an elevator system where noise generation is a concern.

To ensure that there is no leakage flux coupling between the air core inductors 42 and any nearby sensitive components (e.g., a printed circuit board), the illustrated example includes a shield 44 for shielding the air core inductors 42 from any such components. In this example, the shield 44 comprises a housing that at least partially surrounds the air core inductors 42. In one example, the housing 44 completely encloses the air core inductors 42 to isolate them from magnetic materials in the surrounding area. The shield 44 comprises a magnetic material.

The illustrated example includes a cooling element 46 associated with the air core inductors 42. In the illustration, the cooling element 46 is supported within the housing 44. In another example, the cooling element 46 is at least partially outside of the housing 44. One example cooling element 46 comprises a fan. In one example, a fan is outside of the housing 44 and associated with an air channel for directing air toward the air core inductors 42. Another example cooling element 46 comprises a coolant loop through which fluid flows for absorbing heat from the coils of the air core inductors 42.

The example of FIG. 2 includes other components associated with the machine 30. Switches 50 and 52 are selectively controlled depending on the needs of a particular situation. The switch 52 selectively opens of closes the circuit between the load (e.g., power grid) and the motor 52. A filter 54, converter 56, DC bus 58 and an inverter 60 are included and operate in known manners for realizing a regenerative elevator machine drive. The switch 50 closes for two-phase charging of the DC bus 58 during a power on procedure. Once the DC bus 58 is charged, the switch 50 opens and stays that way during elevator operation.

The inclusion of the air core inductors 42 eliminates the source of noise that is otherwise present in other elevator machine regenerative drives. In one example, acoustical noise is reduced on the order of 20 dBA compared to the regenerative drive including an iron core inductor. One advantage of the illustrated example is that no additional measures are required for absorbing noise that would otherwise be produced A lower noise elevator system is desirable and the disclosed example provides an efficient realization of a lower noise elevator machine arrangement.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator machine, comprising:
a motor that operates in a first mode to move an elevator car and in a second mode to generate power;
a line reactor associated with the motor for delivering power to the motor operating in the first mode and delivering power generated by the motor operating in the second mode, the line reactor comprising an air core inductor.

2. The elevator machine of claim 1, comprising
a shield near the line reactor to shield at least a selected component in a vicinity of the air core inductor from magnetic flux.

3. The elevator machine of claim 2, wherein the shield comprises a housing that at least partially surrounds the air core inductor.

4. The elevator machine of claim 2, wherein the shield comprises a magnetic material.

5. The elevator machine of claim 1, comprising
a cooling element associated with the line reactor for cooling the air core inductor.

6. The elevator machine of claim 1, wherein the line reactor comprises three air core inductors.

* * * * *